(12) United States Patent
Hanada et al.

(10) Patent No.: US 10,476,272 B2
(45) Date of Patent: Nov. 12, 2019

(54) POWER GENERATION FACILITY AND POWER GENERATION CONTROL DEVICE

(71) Applicant: TOSHIBA MITSUBISHI—ELECTRIC INDUSTRIAL SYSTEMS CORPORATION, Chuo-ku (JP)

(72) Inventors: Masato Hanada, Tokyo (JP); Daisuke Tsurumaru, Tokyo (JP)

(73) Assignee: TOSHIBA MITSUBISHI—ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 103 days.

(21) Appl. No.: 15/741,316

(22) PCT Filed: Sep. 1, 2015

(86) PCT No.: PCT/JP2015/074845
§ 371 (c)(1),
(2) Date: Jan. 2, 2018

(87) PCT Pub. No.: WO2017/037868
PCT Pub. Date: Mar. 9, 2017

(65) Prior Publication Data
US 2018/0191162 A1 Jul. 5, 2018

(51) Int. Cl.
*H02J 3/32* (2006.01)
*H02J 3/38* (2006.01)
*H02J 7/35* (2006.01)

(52) U.S. Cl.
CPC ............... *H02J 3/32* (2013.01); *H02J 3/383* (2013.01); *H02J 7/35* (2013.01); *H02J 3/386* (2013.01); *Y02P 90/50* (2015.11)

(58) Field of Classification Search
USPC .......................................................... 307/19
See application file for complete search history.

(56) References Cited

FOREIGN PATENT DOCUMENTS

JP 2013179737 * 9/2013
JP 2017117003 A 6/2014

OTHER PUBLICATIONS

International Search Report dated Nov. 17, 2015 in PCT/JP2015/074845, filed on Sep. 1, 2015.

* cited by examiner

*Primary Examiner* — Rexford N Barnie
*Assistant Examiner* — Xuan Ly
(74) *Attorney, Agent, or Firm* — Oblon, McClelland, Maier & Neustadt, L.L.P.

(57) ABSTRACT

A power generation facility 10 includes a power generation system 30, a storage battery system 40, and an in-facility electric wire 21. The power generation facility 10 causes the storage battery system 40 to be charged with some of power supplied by the power generation system 30 to the in-facility electric wire 21 so that change per control cycle in the power supplied to a power system is within a stipulated proportion of rated output of the power generation facility 10. The power generation control device 1 calculates an allowable power generation value for which a power value according to the stipulated proportion of the rated output and a maximum value of charging power per control cycle of the storage battery system 40 are added to a value for which a current value of the power charged by the storage battery system 40 is subtracted from a current value of the power supplied by the power generation system 30 to the in-facility electric wire 21. In addition, the power generation control device 1 suppresses the power supplied by the power generation system 30 to the in-facility electric wire 21 to be equal to or smaller than the allowable power generation value, in a case where the power supplied from the power generator is larger than the allowable power generation value in the next control cycle.

4 Claims, 8 Drawing Sheets

POWER GENERATION FACILITY AND POWER GENERATION CONTROL DEVICE

FIELD

The present disclosure relates to a power generation facility including a power generation system, a storage battery system, and an in-facility electric wire connecting the power generation system, the storage battery system and a power system, and a power generation control device provided in the power generation facility.

BACKGROUND

A power system is constructed by connecting a power generation facility and a load facility by a power transmission and distribution facility. There are power systems of various scales from a large-scaled system connecting a plurality of large-scaled power plants and many factories, commercial facilities and households to a small-scaled system constructed within a specific facility.

As one of the power generation facilities, there is the one including a power generation system utilizing natural energy such as solar light or wind power. The power generation system utilizing the natural energy is being widely introduced in response to rise of awareness of an energy problem or an environmental problem in recent years. However, the power generation system utilizing the natural energy has a demerit that power cannot be stably supplied since generated power is easily affected by natural factors such as seasons or weather. In order to compensate for the demerit, the power generation facility for which the power generation system and a storage battery system are combined has been taken into consideration.

The storage battery system is used as a means for stabilizing power supplied by the power generation facility to the power system. Formerly, storage of a large amount of power was considered to be difficult, but the storage of the large amount of power is made possible by a storage battery of a large capacity such as a lithium-ion battery or a sodium-sulfur battery being made practical. By connecting the storage battery system including such a storage battery to the power generation system, an operation of charging excess power to the storage battery when supply is excessive compared to demand of the power and compensating for insufficiency of the power by discharge from the storage battery when the supply is insufficient compared to the demand of the power is possible. By combining the storage battery system with the power generation system utilizing the natural energy, the generated power which varies depending on seasons or weather or the like is leveled by charging and discharging of the storage battery, and the power can be stably supplied to the power system.

Note that the applicant recognizes the literature described below as the one related to the present disclosure. PTL 1 discloses a configuration in which a photovoltaic power generation system and a storage battery system are connected and variation of generated power of photovoltaic power generation is suppressed by charging/discharging control of a storage battery.

CITATION LIST

Patent Literature

[PTL 1] JP 2014-117003 A

SUMMARY

Technical Problem

Incidentally, in order to stably supply power to a power system, a power generation facility is requested to control a power change rate (referred to as a system supply power change rate, hereinafter) of the power supplied to the power system to rated output (the maximum power that the power generation facility can supply to the power system) of the power generation facility to be within a range of ±n %/minute. When the rated output (the maximum power that the storage battery system can charge/discharge) of the storage battery system is larger than the rated output (the maximum power that the power generation system can supply) of the power generation system, even when the power supplied from the power generation system to an in-facility electric wire drastically increases, by causing the storage battery system to be charged with the drastically increased power, the system supply power change rate can be controlled to be within the range of ±n %/minute. Therefore, drastic change of the power supplied to the power system can be suppressed.

However, it is needed to prepare the storage battery system having the rated output equal to that of the power generation system for that, and in the case where the rated output of the storage battery system is lower than the rated output of the power generation system, a charging capacity of the storage battery system is insufficient and sometimes the system supply power change rate cannot be kept. From a viewpoint of cost reduction, it is desired that the power can be stably supplied to the power system by controlling the system supply power change rate to be within a stipulated range, in the power generation facility including the storage battery system of the rated output lower than that of the power generation system.

The present disclosure is implemented to solve the above-described problem, and an object is to provide a power generation facility and a power generation control device capable of stably supplying power to a power system even when generated power steeply increases, in the power generation facility including a storage battery system of rated output lower than that of a power generation system.

Solution to Problem

In order to achieve the object described above, a power generation facility relating to the present disclosure is configured as follows. The power generation facility is connected to a power system, and includes a power generation system, a storage battery system, an in-facility electric wire, and a power generation control device.

The power generation system includes a power generator, generated power of which varies depending on weather. The power generation system is a photovoltaic power generation system or a wind power generation system for example. The storage battery system includes a storage battery. The storage battery may be configured by a single storage battery cell, or may be configured as an aggregate of a plurality of storage battery cells. As a kind of the storage battery, the storage battery of a large capacity such as a lithium-ion battery, a sodium-sulfur battery or nickel-hydrogen battery is preferable. The in-facility electric wire connects the power generation system, the storage battery system and the power system. Note that the rated output of the storage battery system is smaller than the rated output of the power generation system.

The power generation facility causes the storage battery system to be charged with some of the power supplied by the power generation system to the in-facility electric wire so that change per control cycle in the power supplied to the power system is within a stipulated proportion of the rated output. A control cycle is set at several milliseconds to several tens of milliseconds for example.

The power generation control device includes allowable power generation value calculation means, and output suppression means. The allowable power generation value calculation means calculates an allowable power generation value for which a power value according to the stipulated proportion of the rated output of the power generation facility and a maximum value of charging power per control cycle of the storage battery system are added to a value for which a current value of the power charged by the storage battery system is subtracted from a current value of the power supplied by the power generation system to the in-facility electric wire.

In the case where the power supplied from the power generator is larger than the allowable power generation value in the next control cycle, the output suppression means suppresses the power supplied by the power generation system to the in-facility electric wire to be equal to or smaller than the allowable power generation value.

Advantageous Effects of Invention

According to the present disclosure, the power generation control device can calculate an optimum allowable power generation value in the next control cycle for each control cycle. Then, in the case where the power supplied from the power generator is larger than the allowable power generation value in the next control cycle, the power supplied by the power generation system to the in-facility electric wire is suppressed to be equal to or smaller than the allowable power generation value. Since the optimum allowable power generation value in the next control cycle is calculated for each control cycle, even in the case where the generated power steeply changes in the power generation facility where the rated output of the storage battery system is lower than the rated output of the power generation system, the change per control cycle in the power supplied to the power system can be within the stipulated proportion of the rated output of the power generation facility. That is, in the low-cost power generation facility in which the capacity of the storage battery system is low, the power can be stably supplied to the power system.

DESCRIPTION OF EMBODIMENTS

Hereinafter, the embodiment of the present disclosure will be described in details with reference to the drawings. Note that same signs are attached to elements in common in the respective drawings and redundant description is omitted.

Embodiment 1

[System Configuration of Embodiment 1]

Figure 1:
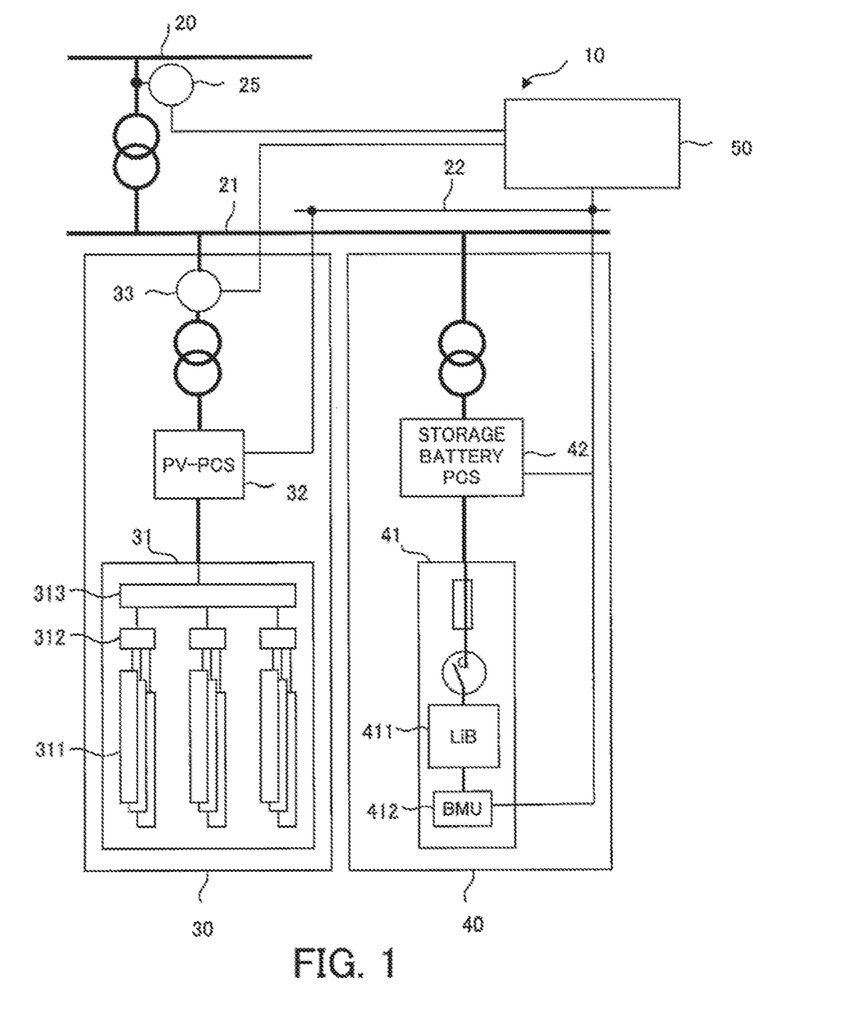
FIG. 1 is a schematic configuration diagram for describing a system configuration relating to an embodiment 1 of the present disclosure.

FIG. 1 is a schematic configuration diagram for describing a system configuration relating to the embodiment 1 of the present disclosure. A power generation facility 10 illustrated in FIG. 1 is connected to a power transmission facility 20 of a power system. The power system includes, in addition to the power transmission facility 20, another power generation facility (illustration omitted) connected to the power transmission facility 20, and a load facility (illustration omitted) connected to the power transmission facility 20.

In addition, the power generation facility 10 includes a power generation system 30, generated power of which varies depending on weather, a storage battery system 40 including a storage battery, and an in-facility electric wire 21 connecting the power generation system 30, the storage battery system 40 and the power system. Note that, in the power generation facility 10, rated output (maximum power that the storage battery system 40 can charge/discharge) of the storage battery system 40 is smaller than rated output (maximum power that the power generation system 30 can supply) of the power generation system 30.

Further, the power generation facility 10 includes a general control device 50. The general control device 50 connects the power generation system 30 and the storage battery system 40 through a computer network 22. On an interconnection point of the power generation facility 10 and the power system, a power meter 25 is provided. The power meter 25 is connected to the general control device 50 by a signal line.

(Power Generation System)

The power generation system 30 illustrated in FIG. 1 is a photovoltaic power generation (PV) system. Note that the power generation system 30 may be a wind power generation system or the like. The power generation system 30 includes a photovoltaic power generator 31, a power conditioning system (PV-PCS, hereinafter) 32 for photovoltaic power generation, and a power meter 33. The photovoltaic power generator 31 includes a plurality of PV modules 311, connection boxes 312 to which the plurality of PV modules 311 are connected, and a power collection box 313 to which the plurality of connection boxes 312 are connected. The power collection box 313 is connected to the PV-PCS 32. The power generated in the plurality of PV modules 311 is supplied through the power collection box 313 to the PV-PCS 32.

The PV-PCS 32 has a function of converting DC power supplied from the photovoltaic power generator 31 to AC power. In addition, the PV-PCS 32 includes a current sensor and a voltage sensor, refers to output values of the sensors and executes adjustment of the power. The PV-PCS 32 is connected to the in-facility electric wire 21. The power meter 33 is connected to the general control device 50 by a signal line. The power generation system 30 is connected through the computer network 22 to the storage battery system 40 and the general control device 50.

The power meter 33 regularly detects supply power supplied from the power generation system 30 to the in-facility electric wire 21. However, regular detection in the present embodiment is a concept including not only an operation of fetching continuous signals without interruption from the sensor but also an operation of fetching signals of the sensor in a predetermined short cycle. A supply power value detected in the power meter 33 is inputted to the general control device 50.

(Storage Battery System)

The storage battery system 40 includes a storage battery device 41, and a power conditioning system (storage battery PCS, hereinafter) 42 for a storage battery. In the storage battery system 40 illustrated in FIG. 1, one storage battery device 41 is connected to one storage battery PCS 42, but it is just an example. Generally, a plurality of storage battery devices 41 are connected in parallel to one storage battery PCS 42. A parallel number of the storage battery device 41 is determined based on a specification of the storage battery PCS 42. The storage battery system 40 is connected through the computer network 22 to the power generation system 30 and the general control device 50.

The storage battery device 41 includes a storage battery module 411, and a storage battery monitoring device (BMU: Battery Management Unit, hereinafter) 412. The storage battery module 411 is a module in which a plurality of cells are connected in series. Each cell is a lithium-ion battery (LiB). The storage battery module 411 is connected to the storage battery PCS 42 by a power transmission line through a contactor and a fuse. In addition, the storage battery module 411 is connected to the BMU 412 by a signal line. The BMU 412 is connected through the computer network 22 to the general control device 50.

The BMU 412 monitors a state of the storage battery module 411. Specifically, the BMU 412 includes a current sensor, a voltage sensor and a temperature sensor as means for measuring a state quantity of the storage battery module 411. A current flowing to the storage battery module 411 is measured by the current sensor. A voltage of each cell is measured by the voltage sensor. Then, a temperature of the storage battery module 411 is measured by the temperature sensor. The storage battery module 411 is regularly monitored by the BMU 412. However, regular monitoring in the present embodiment is the concept including not only the operation of fetching continuous signals without interruption from the sensor but also the operation of fetching signals of the sensor in a predetermined short cycle. The BMU 412 transmits storage battery information including information obtained by measurement by the respective sensors to the general control device 50.

The storage battery PCS 42 is connected to the in-facility electric wire 21 by a power transmission line through a transformer. The storage battery PCS 42 has a charging function of converting the AC power outputted by the power generation system 30 to the DC power and charging it to the storage battery module 411, and a discharging function of converting the DC power of the storage battery module 411 to the AC power and discharging it to the power system. A charging power amount to the storage battery module 411 and a discharging power amount from the storage battery module 411 are adjusted by the storage battery PCS 42. The charging/discharging power amounts are adjusted by the storage battery PCS 42 according to charging/discharging commands supplied from the general control device 50. The charging/discharging command includes a request regarding active power and reactive power to be charged/discharged by the storage battery PCS 42. The storage battery PCS 42 includes a current sensor and a voltage sensor, and the storage battery PCS 42 refers to output values of the sensors and executes adjustment of the charging/discharging power amounts.

(General Control Device)

The general control device 50 is connected through the computer network 22 to the power generation system 30 and the storage battery system 40. The general control device 50 controls power supply and demand between the power system and the power generation facility 10. For example, the general control device 50 includes a charging/discharging command unit 60 and an allowable power generation value calculation unit 61 to be described later.

The power meter 25 regularly detects combined power supplied from the power generation facility 10 to the power system. The combined power is the power for which the power supplied by the power generation system 30 and the charging/discharging power of the storage battery system 40 are combined. However, the regular detection in the present embodiment is the concept including not only the operation of fetching continuous signals without interruption from the sensor but also the operation of fetching signals of the sensor in a predetermined short cycle. A combined power value detected in the power meter 25 is inputted to the general control device 50.

[Characteristic Configuration of Embodiment 1]

Figure 2:
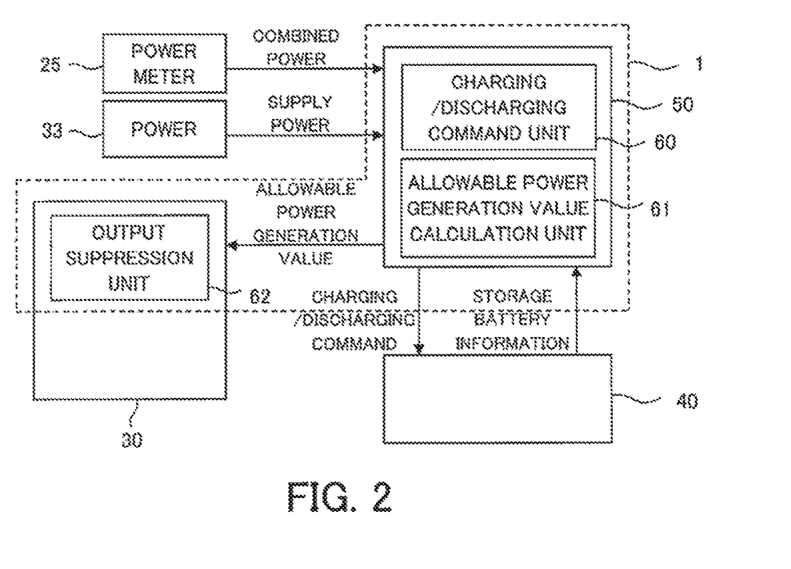
FIG. 2 is a block diagram of a system relating to the embodiment 1 of the present disclosure.

FIG. 2 is a block diagram of a system relating to the embodiment 1 of the present disclosure. A power generation control device 1 relating to the present disclosure is a concept which may include a part of the general control device 50 and the power generation system 30.

Inside a block indicating the general control device 50, a part of various functions that the power generation control device 1 has is expressed by a block. Similarly, inside a block indicating the power generation system 30, a part of various functions that the power generation control device 1 has is expressed by a block.

(Charging/Discharging Command Unit)

The power generation control device 1 has a charging/discharging command function, and the charging/discharging command unit 60 is in charge of the function. The power generation control device 1 receives the combined power value from the power meter 25, receives the supply power value from the power meter 33, and receives the storage battery information from the storage battery system 40 (BMU 412). The charging/discharging command unit 60 determines the charging/discharging command based on the combined power value, the supply power value and the storage battery information, and transmits the charging/discharging command to the storage battery system 40.

Figure 3:
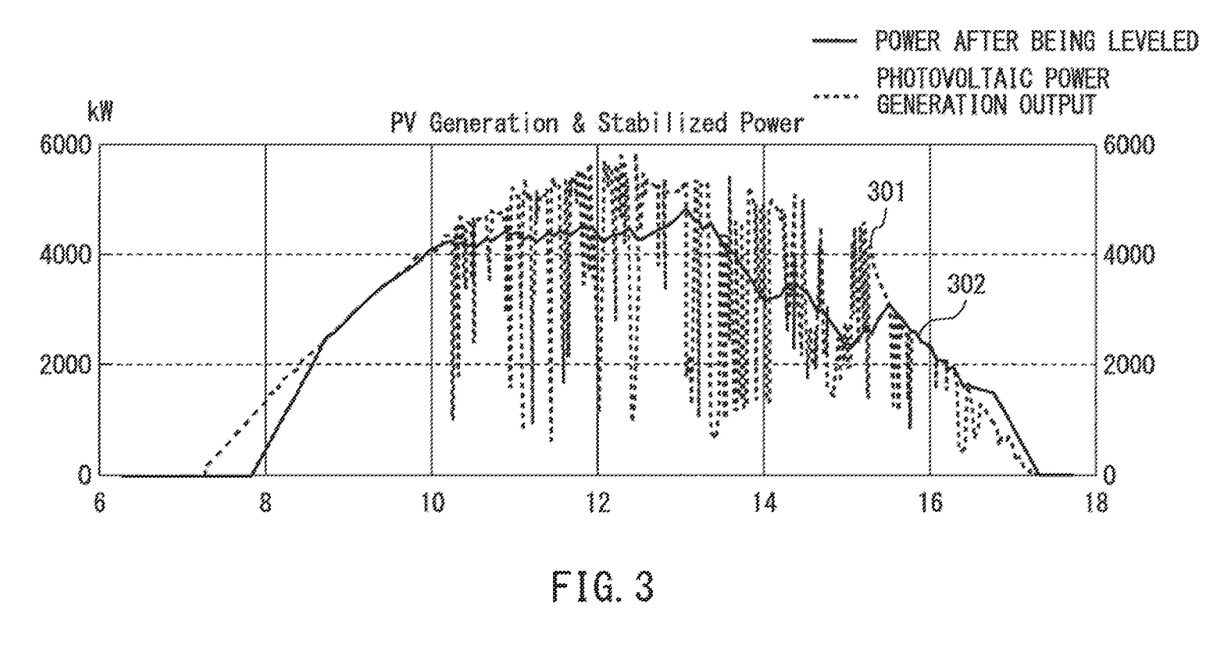
FIG. 3 is a diagram for describing variation of generated power at each hour by a photovoltaic power generation system.

FIG. 3 is a diagram for describing variation of the generated power at each hour by the photovoltaic power generation system. Output of the photovoltaic power generation system varies depending on a quantity of solar radiation. It is typical in the case where clouds flow in fine weather, and while shadows of the clouds pass through on a solar panel, the output drastically varies in a short time. Steep variation needs to be leveled by causing the storage battery system 40 to be charged/discharged so as to cancel output variation of photovoltaic power generation.

In an example illustrated in FIG. 3, by causing the storage battery system 40 to be charged/discharged so as to offset the output of the photovoltaic power generation system indicated by a broken line 301, the output variation is mitigated as a solid line 302. The charging/discharging command unit 60 determines the charging/discharging command so as to level the steep output variation of the photovoltaic power generation by charging/discharging control of the storage battery system 40.

Specifically, in order to stably supply the power to the power system, the power generation facility 10 is requested to control a change rate (referred to as a system supply power change rate, hereinafter) of the power supplied to the power system to rated output (the maximum power that the power generation facility 10 can supply to the power system) of the power generation facility 10 to be within a range of ±n %/minute. Therefore, the charging/discharging command unit 60 determines the charging/discharging command to the storage battery system 40 so that change per control cycle in the power supplied to the power system is within a stipulated proportion of the rated output of the power generation facility. For example, in the control cycle in which the power supplied by the power generation system 30 to the in-facility electric wire 21 increases, the charging/discharging command unit 60 determines the charging/discharging command to cause the storage battery system 40 to be charged with some of the power supplied by the power generation system 30 to the in-facility electric wire 21. Note that the control cycle is set at several milliseconds to several tens of milliseconds. As one example, in the case that the control cycle is 20 milliseconds, the stipulated proportion is 1/3000 of n %.

(Allowable Power Generation Value Calculation Unit)

Figure 4:
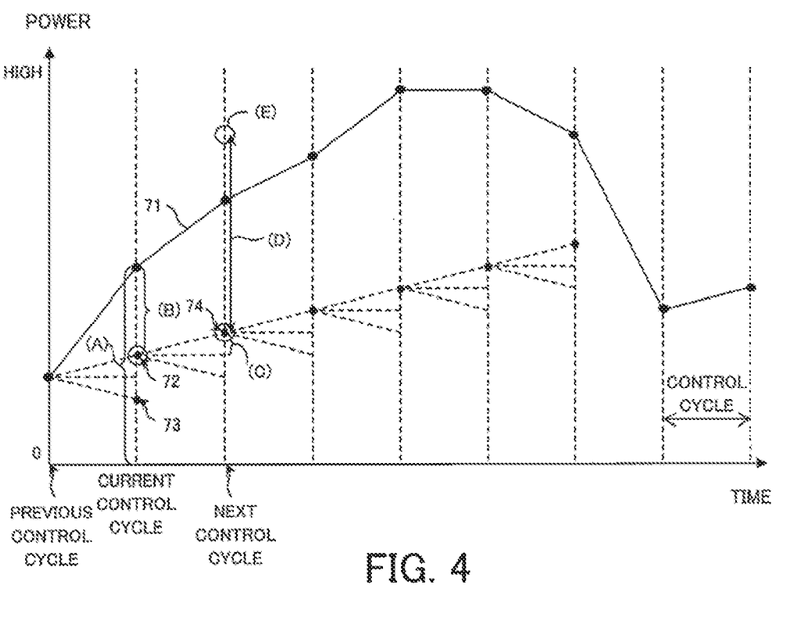
FIG. 4 is a diagram for describing output of a power generation system 30 in each control cycle and calculation of an allowable power generation value.

FIG. 4 is a diagram for describing the output of the power generation system 30 in each control cycle and calculation of an allowable power generation value. A solid line 71 indicates the output of the power generation system 30 in each control cycle. A point 72 is site output (the power supplied by the power generation facility 10 to the power system) in a current control cycle. A point 74 is site output in the next control cycle. In addition, the point 72 is an allowable site output upper limit value in the current control cycle, and a point 73 is an allowable site output lower limit value in the current control cycle. The allowable site output upper limit value is a value corresponding to a maximum value (+n %/minute) of the system supply power change rate. The allowable site output lower limit value is a value corresponding to a minimum value (−n %/minute) of the system supply power change rate. In addition, (A) to (E) indicated in FIG. 4 are defined as follows.

(A) is a current value of the power supplied by the power generation system 30 to the in-facility electric wire 21 in the current control cycle, and is detected by the power meter 33.

(B) is a current value of the power charged by the storage battery system 40, and is included in the charging/discharging command calculated by the charging/discharging command unit 60.

(C) is a power value according to the stipulated proportion of the rated output of the power generation facility 10. The stipulated proportion is a fixed value preset according to the maximum value of the system supply power change rate and the control cycle.

(D) is the maximum value of charging power per control cycle of the storage battery system 40, and is a fixed value preset as the rated output of the storage battery PCS 42.

(E) is the allowable power generation value in the next control cycle, and the allowable power generation value in the next control cycle is expressed by a following equation (1) using the above-described (A) to (E).

$$(E)=(A)-(B)+(C)+(D) \quad (1)$$

The power generation control device 1 has an allowable power generation value calculation function, and the allowable power generation value calculation unit 61 is in charge of the function. The allowable power generation value calculation unit 61 calculates the allowable power generation value in the next control cycle using the equation (1). The calculated allowable power generation value is transmitted to an output suppression unit 62.

(Output Suppression Unit)

The power generation control device 1 has an output suppression function, and the output suppression unit 62 is in charge of the function. The output suppression unit 62 determines whether the generated power supplied from the photovoltaic power generator 31 to the PV-PCS 32 is larger than the allowable power generation value for each control cycle. The generated power supplied from the photovoltaic power generator 31 to the PV-PCS 32 is calculated from the output values of the current sensor and the voltage sensor inside the PV-PCS 32. The allowable power generation value used in determination is the value calculated by the allowable power generation value calculation unit 61 in the control cycle one before execution of processing of the output suppression unit 62.

In the case where the generated power supplied from the photovoltaic power generator 31 to the PV-PCS 32 is equal to or smaller than the allowable power generation value, the system supply power change rate can be controlled to be within ±n %/minute by causing the storage battery system 40 to be charged with the drastically increased power. On the other hand, in the case where the generated power supplied from the photovoltaic power generator 31 to the PV-PCS 32 is larger than the allowable power generation value, since a charging capacity of the storage battery system 40 is insufficient, the system supply power change rate cannot be controlled to be within n/minute only by causing the storage battery system 40 to be charged with the drastically increased power.

Figure 5:
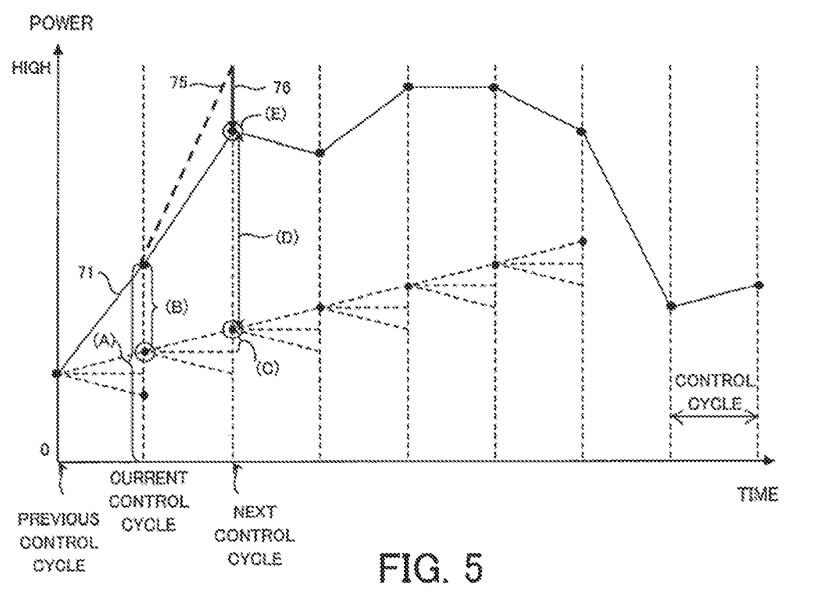
FIG. 5 is a diagram for describing output suppression control in the embodiment 1 of the present disclosure.

FIG. 5 is a diagram for describing output suppression control in the embodiment 1 of the present disclosure. In the next control cycle, in the case that the generated power supplied from the photovoltaic power generator 31 to the PV-PCS 32 is larger than the allowable power generation value, in order to avoid the output of the power generation system 30 as indicated by a broken line 75, the output suppression unit 62 executes the output suppression control of suppressing the power supplied by the power generation system 30 to the in-facility electric wire 21 to be equal to or smaller than the allowable power generation value (arrow 76). Specifically, the output suppression unit 62 executes the control of suppressing the power supplied by the PV-PCS 32 to the in-facility electric wire 21 to be equal to or smaller than the allowable power generation value, to the PV-PCS 32.

(Flowchart)

Figure 6:
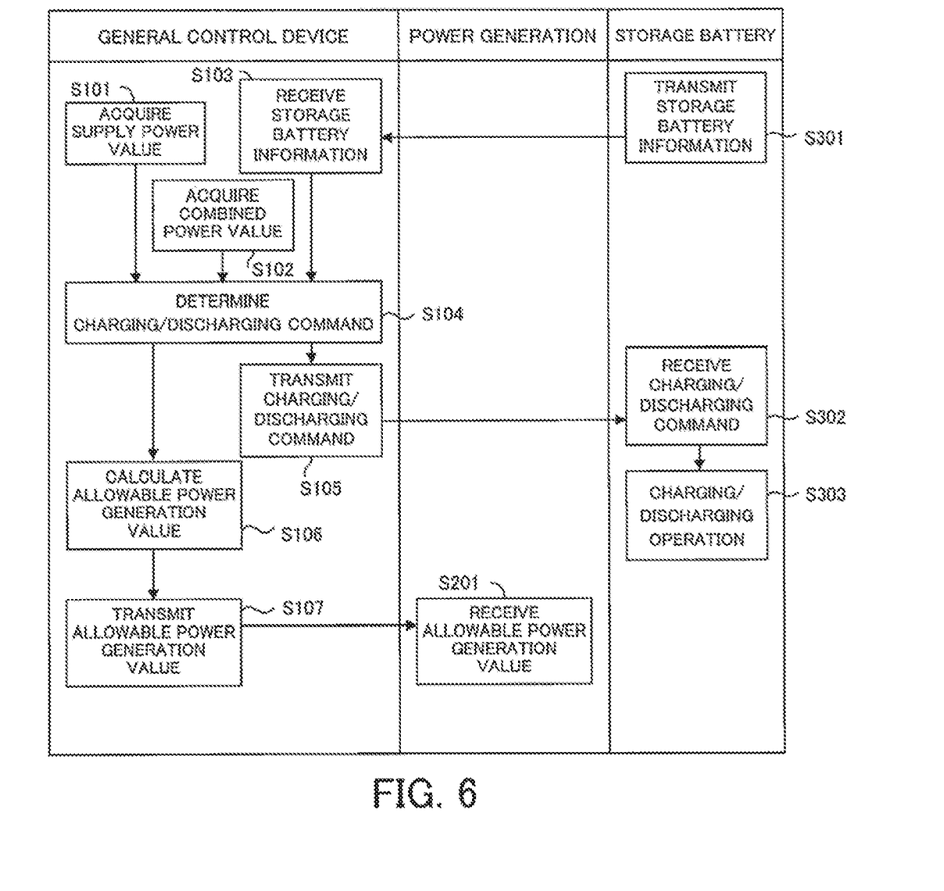
FIG. 6 is a flowchart for describing processing of a charging/discharging command unit 60 and an allowable power generation value calculation unit 61 of a power generation control device 1.

FIG. 6 is a flowchart for describing the processing of the charging/discharging command unit 60 and the allowable power generation value calculation unit 61 of the power generation control device 1. A control routine illustrated in FIG. 6 is executed for each control cycle.

The power meter 33 regularly detects the supply power supplied from the power generation system 30 to the in-facility electric wire 21. The general control device 50 acquires the supply power value detected by the power meter 33 for each control cycle (step S101).

The power meter 25 regularly detects the combined power supplied from the power generation facility 10 to the power system. The general control device 50 acquires the combined power value detected by the power meter 25 for each control cycle (step S102).

The storage battery system 40 transmits the storage battery information to the general control device 50 (step S301). The storage battery information includes the current flowing to the storage battery module 411, the voltage of each cell, and the temperature of the storage battery module 411. The general control device 50 receives the storage battery information transmitted from the storage battery system 40 for each control cycle (step S103).

After the processing of steps S101-S103, the charging/discharging command unit 60 determines the charging/discharging command (step S104). Specifically, the charging/discharging command unit 60 determines the charging/discharging command so that the system supply power change rate is within a variation range of ±n %/minute, based on the supply power acquired in step S101, the combined power acquired in step S102 and storage battery information acquired in step S103. For example, in the control cycle in which the power supplied by the power generation system 30 to the in-facility electric wire 21 increases, the charging/discharging command to cause the storage battery system 40 to be charged with some of the power supplied by the power generation system 30 to the in-facility electric wire 21 is determined.

After the processing of step S104, the charging/discharging command unit 60 transmits the charging/discharging command to the storage battery system 40 (step S105). The storage battery system 40 receives the charging/discharging command transmitted from the general control device 50 (step S302). The storage battery PCS 42 executes a charging/discharging operation according to the received charging/discharging command (step S303).

After the processing of step S104, the allowable power generation value calculation unit 61 calculates the allowable power generation value in the next control cycle using the values obtained in steps S101, S103 and S104 in the current control cycle and the above-described equation (1) (step S106).

After the processing of step S106, the general control device 50 transmits the allowable power generation value to the power generation system 30 (step S107). The power generation system 30 receives the allowable power generation value transmitted from the general control device 50 (step S201).

Figure 7:
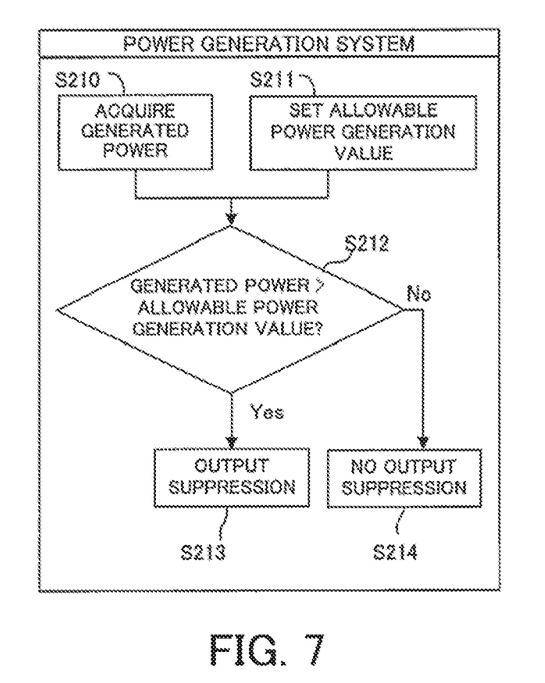
FIG. 7 is a flowchart for describing processing of an output suppression unit 62 of the power generation control device 1.

FIG. 7 is a flowchart for describing the processing of the output suppression unit 62 of the power generation control device 1. A control routine illustrated in FIG. 7 is executed for each control cycle. Here, the processing in the control cycle after the control cycle in which the control routine illustrated in FIG. 6 is executed will be described.

The output suppression unit 62 acquires the generated power supplied from the photovoltaic power generator 31 to the PV-PCS 32 (step S210). In addition, the output suppression unit 62 sets the allowable power generation value received in step S201 in FIG. 6 in the control cycle one before the execution of the control routine illustrated in FIG. 7, to the output suppression unit 62.

After the processing of steps S210 and S211, the output suppression unit 62 determines whether the generated power supplied from the photovoltaic power generator 31 to the PV-PCS 32 is larger than the allowable power generation value (step S212).

In the case where the generated power supplied from the photovoltaic power generator 31 to the PV-PCS 32 is larger than the allowable power generation value, the output suppression unit 62 suppresses the power supplied by the power generation system 30 to the in-facility electric wire 21 to be equal to or smaller than the allowable power generation value (step S213).

On the other hand, in the case where the generated power supplied from the photovoltaic power generator 31 to the PV-PCS 32 is equal to or smaller than the allowable power generation value, the output suppression unit 62 does not execute the control of suppressing the output (step S214).

As described above, according to the system of the present embodiment, the power generation control device 1 can calculate an optimum allowable power generation value in the next control cycle for each control cycle. Then, in the next control cycle, in the case that the power supplied from the photovoltaic power generator 31 is larger than the allowable power generation value, the power supplied by the power generation system 30 to the in-facility electric wire 21 is suppressed to be equal to or smaller than the allowable power generation value. Since the optimum allowable power generation value in the next control cycle is calculated for each control cycle, even in the case where the generated power steeply changes (the power change exceeding the above-described (C)+(D) in one control cycle) in the power generation facility 10 in which the rated output of the storage battery system 40 is lower than the rated output of the power generation system 30, the change per control cycle in the power supplied to the power system can be within the stipulated proportion of the rated output of the power generation facility 10. That is, in the low-cost power generation facility 10 in which the capacity of the storage battery system 40 is low, the power can be stably supplied to the power system.

In addition, according to the present disclosure, since the optimum allowable power generation value is calculated for each control cycle, the output suppression can be irreducible minimum in each control cycle. Therefore, compared to the case where an output suppression schedule is predetermined, unnecessary generated power suppression is little, and power generation efficiency can be improved.

Figure 8:
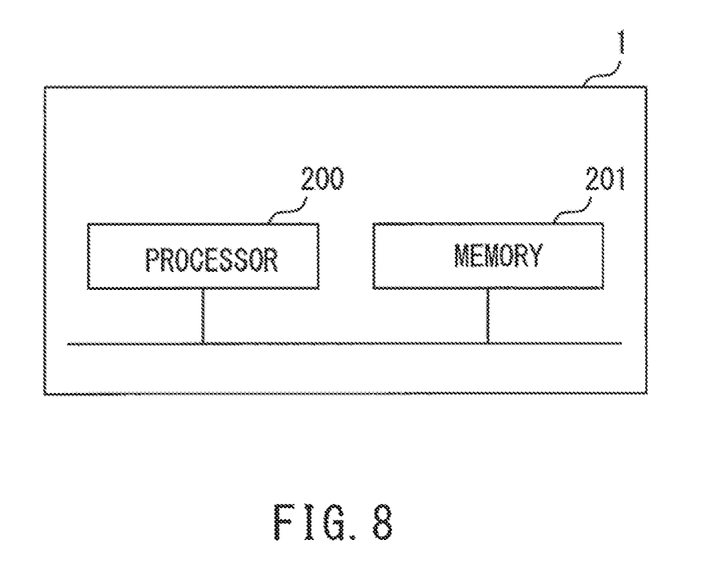
FIG. 8 is a diagram illustrating a hardware configuration of the power generation control device 1.

Note that, in the embodiment 1, the respective units indicated by signs 60-62 indicate the functions that the power generation control device 1 has. FIG. 8 is a diagram illustrating a hardware configuration of the power generation control device 1. The power generation control device 1 is provided with, as a hardware resource, a circuit including an input/output interface (illustration omitted) that inputs and outputs various kinds of information, a memory 201 that stores the various kinds of information and various kinds of programs, and a processor 200 capable of executing arithmetic processing based on the various kinds of information and the various kinds of programs stored in the memory 201. The power generation control device 1 realizes the respective functions that the respective units 60-62 have by executing the programs stored in the memory 201 by the processor 200. The power generation control device 1 may include a plurality of processors 200. The power generation control device 1 may include a plurality of memories 201. The power generation control device 1 may include a plurality of input/output interfaces. That is, the plurality of processors 200, the plurality of memories 201 and the plurality of input/output interfaces may cooperate to realize the respective functions that the respective units 60-62 have. In addition, some or all of the respective functions that the respective units 60-62 have may be configured by the circuit.

Note that, as illustrated in FIG. 2, the power generation control device 1 may be configured by connecting the general control device 50 and the power generation system 30 by the computer network 22. In this case, each of the general control device 50 and the power generation system 30 includes the processor, the memory and the input/output interface.

REFERENCE SIGNS LIST

1 Power generation control device
10 Power generation facility
20 Power transmission facility of power system
21 In-facility electric wire
22 Computer network
25 Power meter
30 Power generation system
31 Photovoltaic power generator
32 PV-PCS
33 Power meter
40 Storage battery system
41 Storage battery device
42 Storage battery PCS
50 General control device
60 Charging/discharging command unit
61 Allowable power generation value calculation unit
62 Output suppression unit
200 Processor
201 Memory
311 PV module
312 Connection box
313 Power collection box
411 Storage battery module
412 BMU

The invention claimed is:

1. A power generation facility comprising:
a power generation system including a power generator, generated power of which varies depending on weather,
a storage battery system including a storage battery, and
an in-facility electric wire connecting the power generation system, the storage battery system and a power system,
the power generation facility causing the storage battery system to be charged with some of power supplied by the power generation system to the in-facility electric wire so that a change per control cycle in the power supplied to the power system is within a stipulated proportion of rated output,
the power generation facility comprising a power generation control device including:
allowable power generation value calculation means for calculating an allowable power generation value for which a power value according to the stipulated proportion of the rated output and a maximum value of charging power per the control cycle of the storage battery system are added to a value for which a current value of the power charged by the storage battery system is subtracted from a current value of the power supplied by the power generation system to the in-facility electric wire; and
output suppression means for suppressing the power supplied by the power generation system to the in-facility electric wire to be equal to or smaller than the allowable power generation value, in a case where the power supplied from the power generator is larger than the allowable power generation value in the next control cycle.

2. The power generation facility according to claim 1, wherein rated output of the storage battery system is smaller than rated output of the power generation system.

3. A power generation control device provided in a power generation facility, the power generation facility comprising:
a power generation system including a power generator, generated power of which varies depending on weather,
a storage battery system including a storage battery, and
an in-facility electric wire connecting the power generation system, the storage battery system and a power system,
the power generation facility causing the storage battery system to be charged with some of power supplied by the power generation system so that a change per control cycle in the power supplied to the power system is within a stipulated proportion of rated output,
the power generation control device comprising:
allowable power generation value calculation means for calculating an allowable power generation value for which a power value according to the stipulated proportion of the rated output and a maximum value of charging power per the control cycle of the storage battery system are added to a value for which a current value of the power charged by the storage battery system is subtracted from a current value of the power supplied by the power generation system to the in-facility electric wire; and
output suppression means for suppressing the power supplied by the power generation system to the in-facility electric wire to be equal to or smaller than the allowable power generation value, in a case where the power supplied from the power generator is larger than the allowable power generation value in the next control cycle.

4. The power generation control device according to claim 3, wherein rated output of the storage battery system is smaller than rated output of the power generation system.

* * * * *